(12) United States Patent
Aoki et al.

(10) Patent No.: US 9,021,522 B2
(45) Date of Patent: Apr. 28, 2015

(54) CONCURRENT INTERACTIVE TELEVISION FOR NETWORK CONNECTED DEVICES

(75) Inventors: Shigeru Aoki, Tokyo (JP); Azmee Carlton Lane, Tokyo (JP); Kenichiro Tanaka, Yokohama (JP); Michimune Kono, Yokohama (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 1780 days.

(21) Appl. No.: 12/332,208

(22) Filed: Dec. 10, 2008

(65) Prior Publication Data

US 2010/0146544 A1    Jun. 10, 2010

(51) Int. Cl.
| | |
|---|---|
| G06F 3/01 | (2006.01) |
| G06F 13/12 | (2006.01) |
| H04N 7/173 | (2011.01) |
| H04N 21/436 | (2011.01) |
| H04N 21/433 | (2011.01) |
| H04N 21/434 | (2011.01) |
| H04N 21/4722 | (2011.01) |
| H04N 21/8543 | (2011.01) |

(52) U.S. Cl.
CPC ..... *H04N 21/43615* (2013.01); *H04N 21/4334* (2013.01); *H04N 21/4348* (2013.01); *H04N 21/4722* (2013.01); *H04N 21/8543* (2013.01)

(58) Field of Classification Search
CPC ............ H04N 21/8173; H04N 21/443; H04N 21/4437
USPC ............. 725/37–39, 74, 78, 82, 85, 105, 109, 725/110, 114, 116, 118, 119, 131, 135, 139, 725/143, 151
See application file for complete search history.

(56) References Cited

U.S. PATENT DOCUMENTS 7,024,684 B2 * 4/2006 Yuzawa ........................ 725/139
7,230,734 B2    6/2007 Hirata
(Continued)

FOREIGN PATENT DOCUMENTS

| EP | 1128674 A1 | 8/2001 |
|---|---|---|
| EP | 1809028 A1 | 7/2007 |

OTHER PUBLICATIONS

NetFront DTV Solution, Forging Ahead in Digital Broadcast Browsing Solutions, http://www.access-company.com/PDF/DTV_2007_05.pdf.

(Continued)

*Primary Examiner* — Benjamin R Bruckart
*Assistant Examiner* — Jason Thomas
(74) *Attorney, Agent, or Firm* — Ladislav Kusnyer; Judy Yee; Micky Minhas

(57) ABSTRACT

Techniques are disclosed herein for processing iTV. A request to play a first interactive television signal at a first electronic device is received. A first virtual machine for processing the first interactive television signal is instantiated at the first electronic device. A first file that includes information associated with playing interactive TV on the first electronic device is accessed from non-volatile storage on the first electronic device. A request to play a second interactive television signal at a second electronic device that is communicatively coupled to the first electronic device is received. A second virtual machine for processing the second interactive television signal is instantiated at the first device. A second file that includes information associated with playing interactive TV on the second electronic device is stored in non-volatile storage on the first electronic device.

19 Claims, 8 Drawing Sheets

(56) References Cited

U.S. PATENT DOCUMENTS

| | | | |
|---|---|---|---|
| 7,992,187 B2* | 8/2011 | Chiao | 725/153 |
| 2003/0122862 A1 | 7/2003 | Takaku | |
| 2004/0143840 A1 | 7/2004 | Fukuda et al. | |
| 2005/0094031 A1* | 5/2005 | Tecot et al. | 348/473 |
| 2005/0100321 A1 | 5/2005 | Koudo et al. | |
| 2005/0223404 A1 | 10/2005 | Ishiguro et al. | |
| 2006/0037053 A1* | 2/2006 | McDowell et al. | 725/80 |
| 2007/0174410 A1* | 7/2007 | Croft et al. | 709/208 |
| 2007/0230894 A1 | 10/2007 | Kimura et al. | |
| 2009/0006955 A1* | 1/2009 | Wang et al. | 715/702 |

OTHER PUBLICATIONS

SeaChange Debuts Next Generation of Broadcast Systems, Media Library, Broadcast Engineering, Apr. 15, 2004, http://broadcastengineering.com/news/broadcasting_seachange_debuts_next/.

Mary-Jo Foley, Keeping Track of Microsoft . . . by the codehames, Oct. 17, 2008, blogshttp://blogs.zdnet.com/microsoft/?cat=66.

Chris Albrecht, Vid-Biz: CDNetworks, Roku, Apple, NewTeeVee, Jul. 24, 2008, http://newteevee.com/?s=vid-biz%3A+CDNetworks%2C+Roku%2C+Apple.

\* cited by examiner

CONCURRENT INTERACTIVE TELEVISION FOR NETWORK CONNECTED DEVICES

BACKGROUND

In addition to video and audio data, broadcast media streams may contain data for interactive television (iTV). One example of iTV is a user watching a television quiz show and taking the quiz interactively by using a remote control to answer questions presented on the display screen. The user's answers may be sent back to a server. Another example is a user watching a televised talent competition and voting for one of the contestants. There is virtually no limit to the possibilities of interactive TV; therefore, the foregoing should be understood to be non-limiting examples.

More and more broadcasters are choosing to adopt iTV. Some countries even require that broadcasters provide iTV support. In Japan, presently all broadcast operators use Broadcast Markup Language (BML), which is a descriptive language based on the eXtensible Markup Language (XML). BML was developed by the Association of Radio Industries and Businesses (ARIB) standard body as a data broadcasting specification for digital television broadcasting. BML browsers on an electronic device can receive broadcast video and data simultaneously and can provide bi-directional services such as online surveys along with TV programming. As the foregoing suggests, BML enables the user to play games, vote on Karaoke contests and order items on shopping channels associated with watching TV program.

In 1999, ARIB published a specification for digital broadcasting. Numerous revisions to that specification have been made since then. ARIB STD B24 "Data Coding and Transmission Specification for Digital Broadcasting" (Version 5.2), is hereby incorporated herein by references for all purposes. Note that there are many other iTV standards such as Multimedia and Hypermedia Experts Group (MHEG), Multimedia Home Platform (MHP), and OpenCable Application Platform (OCAP).

SUMMARY

Techniques are disclosed herein that provide for concurrent interactive television for networked devices. A host device (e.g., personal computer) has a virtual machine (VM) for each electronic device on the network that is used to play interactive TV. The personal computer also stores information in a file for each electronic device on the network, such that user preferences, session information, etc. can be remembered from one viewing session to the next. The personal computer provides processed data (e.g., a video signal for TV and webpage-like documents for the interactive aspects) to the video game console over the network.

One aspect is a machine implemented method for processing iTV, which includes the following steps. A request to play a first iTV signal at a first electronic device is received. A first virtual machine for processing the first iTV signal is instantiated at the first electronic device. A first file that includes information associated with playing iTV on the first electronic device is accessed from non-volatile storage on the first electronic device. A request to play a second iTV signal at a second electronic device that is communicatively coupled to the first electronic device is received. A second virtual machine for processing the second iTV signal is instantiated at the first device. A second file that includes information associated with playing interactive TV on the second electronic device is accessed from non-volatile storage on the first electronic device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
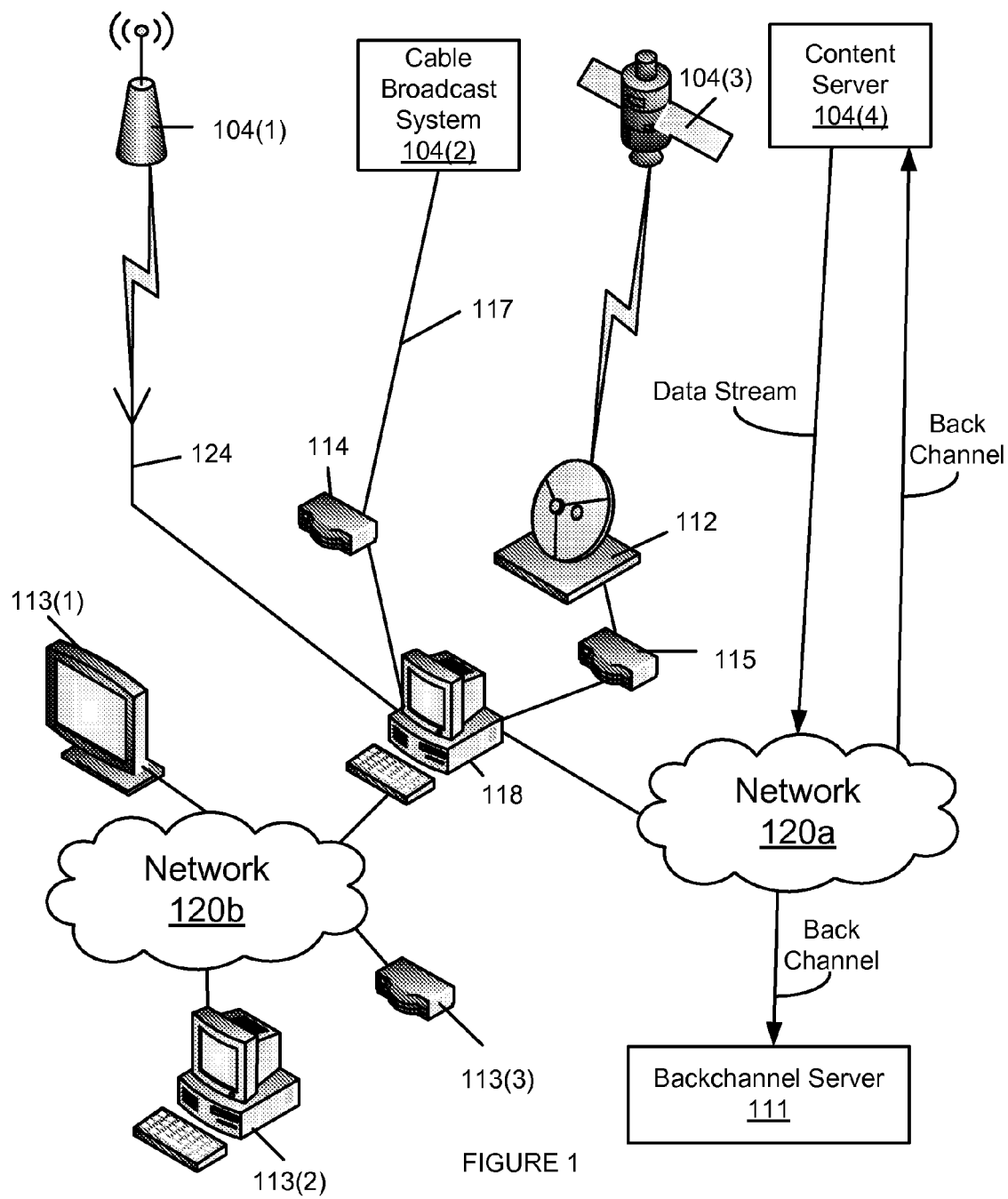
FIG. 1 illustrates an exemplary system in which various embodiments described herein can be implemented.

FIG. 1 illustrates an exemplary environment in which iTV is provided to electronic devices. In this example, one electronic device serves as a host device 118, which receives the interactive TV signals, processes them, and forwards the processed signals on to "extended devices" 113 connected to network 120b. For example, host device 118 is a personal computer in one room and extended device 113(1) is a television set in another room, extended device 113(2) is a personal computer in another room, and extended device 113(3) is a video game console. An example use scenario is as follows. Abby and Toby own a personal computer (host device 118) with a dual tuner which they keep in a study room and a television with a video game console (extended device 113) which they keep in the living room. Abby is able to watch an iTV program and read the script for the interactive TV program in the living room, while Toby watches his favorite interactive quiz show in the bedroom and plays the quiz.

Note that it is not required that the host device 118 be a personal computer. Host device 118 can be implemented in a number of ways. For example, host device 118 might be a personal computer, video game console, set top box, television set, etc. The host device 118 is connected to various devices to receive an iTV signal. Host device 118 is connected to an antenna 124 to receive interactive program content from a local television station. Host device 118 is connected to a cable network 117 through device 114 to receive program content from a cable system 104(2). Device 114 is also referred to as a set-top box. Host device 118 is coupled to a satellite dish 112 through device 115 to receive program content from the satellite 104(3). Device 115 may also be referred to as a set-top box or a satellite-receiving device. Host device 118 is connected to a network 120 (e.g., the Internet) to receive program content from the content server 104(4). For example, the host 118 may receive Internet Protocol Television (IPTV). Numerous vendors provide software programs for receiving Internet Television. An example of such a software product is the Microsoft Mediaroom™ Internet Protocol Television (IPTV) software platform, which is commercially available from Microsoft Corporation of Redmond, Wash. The host device 118 can also receive program content from a network source that is not on the Internet.

The local television antenna 104(1) may be used to transmit a signal from a local television (or radio) station. The cable broadcast system 104(2) provides content from a cable television provider. The satellite 104(3) provides a signal from a satellite television provider. The content server 104(4) provides a signal from an Internet television provider. FIG. 1 presents only a few example program sources 104. In addition to audio/visual content, the signals transmitted by the program sources 104 may have iTV content. Numerous standards for transmitting iTV content exist. Moreover, iTV may be provided in a proprietary format. The audio visual content could be television programs, movies, commercials, music, and similar audio and/or video content. Thus, the signals from the program sources 104 are not limited to television programs.

The host device 118 executes software to process the television signals to play iTV programs, etc. on the host device 118 and to forward video and data to the extended devices 113 such that they can also play iTV. Such software can also be used to play television content based on the output of a tuner in the host device 118 or in a device connected to the host device 118. Further, the host device 118 can receive and play program content from any of the sources 104(1)-104(4) through a tuner whether the tuner is hardware, software, or some combination of hardware and software. However, note that the host device 118 is not required to receive content from any particular source 104.

In some implementations, a back channel is used to transmit information from the host device 118 back to the program source, or another location, as a part of the iTV experience. For example, a user might make a purchase in response to seeing a product of interest in an interactive shopping program. In one aspect the network 120a is used to implement the back channel. As one example, the host device 118 uses the Internet to send information to the content server 104(4), which is providing the interactive content. However, a back channel can also be used when receiving iTV from other content providers. For example, if the satellite 104(3) is providing the content to set top box 115, the set top box can interface with the host device 118 to access a back channel through the network 120a. Note that in this case, a server other than content server 104(4) is likely to be accessed via the backchannel.

It is to be appreciated and understood that the exemplary system 100 constitutes but one exemplary operating environment. Accordingly, this description is not intended to limit application of the claimed subject matter to just this one type of operating environment. Rather, the principles described herein can be implemented in other similar or different environments without departing from the spirit and scope of the claimed subject matter.

Figure 2:
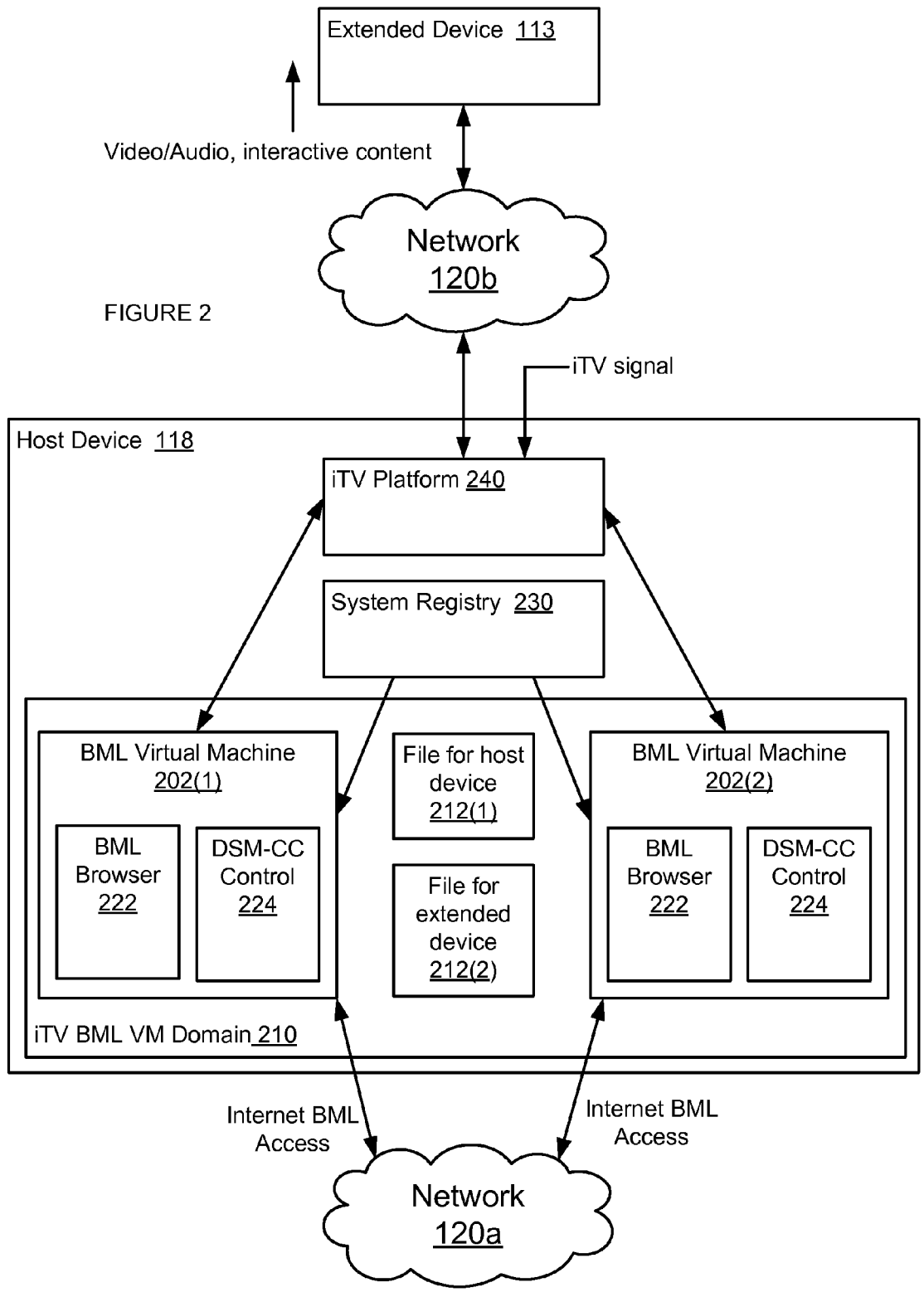
FIG. 2 depicts one embodiment of a host device depicting the various software components used to implement iTV.

FIG. 2 depicts one embodiment of a host device 118 depicting the various software components used to implement iTV. The host device 118 is connected to an extended device 113 over the network 120b. The host device 118 processes an iTV signal (which may be a live signal or a recorded signal) and extracts video/audio and data. For example, the video/audio may be a signal for rendering a television signal. The data is for the interactive portion of the signal. In one embodiment, the data for the interactive portion includes BML documents, which are documents based on the Broadcast Markup Language. However, the data for the interactive portion can be other than BML.

As one example, the extended device 113 could be an Xbox® video game system or an Xbox 360® video game and entertainment system, both of which are provided by Microsoft Corporation of Redmond, Wash. The extended device 113 could be other than an Xbox® video game system or an Xbox 360® video game and entertainment system. Moreover, the extended device 113 does not have to be a video game console. More generally, the extended device 113 can be any electronic device that is capable of processing the video and data from the host device 118 and displaying it on a display screen connected to the extended device 113.

The host device 118 has an iTV platform 240, which captures and controls the iTV data source. The iTV platform 240 is capable of rendering the video portion of the television signal on a display screen, as well as delivering the audio portion of the television signal to speakers. The iTV platform 240 also can perform other functions such as allowing the VM 202 to tune television channels, and access the iTV data delivered on the iTV signal. Many other functions such as displaying an electronic program guide (EPG) are possible.

The iTV BML VM domain 210 on the host device 118 refers to the software components and data structures for processing the iTV signal for a particular iTV standard. The VM domain 210 has at least one VM 202 that is for processing the iTV signal for a particular iTV standard. Many iTV standards define the interface for a VM to be used to receive and process the iTV signal. In general, a VM is software that can be thought of as an implementation of a machine (e.g., computer) that executes software applications like a real machine. A goal of a VM is to allow applications to interact with the VM independent of the actual hardware and operating system. A given iTV standard may define how an iTV VM for that iTV standard should behave, what inputs to accept, how to react to the input, and what APIs to provide to applications that interface with the iTV VM. For example, the host device may have a BML VM for processing an iTV signal in compliance with the ARIB STD B24 "Data Coding and Transmission Specification for Digital Broadcasting." In one implementation, the BML VM is implemented such that it complies with requirements of ARIB STD B24. Note that the host device 118 can have a VM for processing iTV in accordance with a different standard. An example of a different standard (which involves MHEG-5) is "Coding of Multimedia and Hypermedia Information—Part 5, Support for Base-level Interactive Applications" (ISO/IEC 13522-5), which is from the International Organization for Standardization (ISO).

The virtual domain 210 currently has two BML VMs 202(1), 202(2) instantiated. One VM 202 is instantiated for each device on the network 120b that is currently playing iTV. Each of the VMs 202 extracts the interactive portion (e.g., a BML document) of the iTV signal and provides it for display on either the host device 118 or an extended device 113. The BML document may be displayed as a page in manner similar to displaying a web page. In one implementation, the VM 202 reserves a region of the page for the television video. Thus, a user can watch a television quiz show (video component) while taking a quiz (interactive component). The host device 118 may have additional VMs 202 for additional extended devices 113. The VM 202 is implemented by executing computer readable instructions on a processor on the host device 118. Note that an instance of a VM is not instantiated unless a request is received to process an iTV signal.

In one implementation, the BML browser 222 processes the data broadcast data described by a BML document. The BML browser 222 processes a BML document and monomedia data referred by the BML document. The monomedia data may include JPEG, PNG and MNG as a still image, MPEG1 and MPEG2 as a moving image, MPEG2-AAC and AIFF as audio data, and an 8-unit code as a text.

The VM domain 210 has a separate file 212 for each device 113, 118 on the network 120*b*. As depicted, file 212(1) is for the host device 118 and file 212(2) is for the extended device 113. The file 212 in the virtual domain 210 contains user and broadcaster data, settings, and configurations. One exemplary use of the file 212 is for the broadcaster to store information from one session to be used during a later session. For example, if the user is taking an interactive quiz, the broadcaster might save the user's answers to allow the user to continue the quiz later. As another example, a home shopping network might save certain user information to speed up the purchasing process.

In one implementation, the file 212 is a data structure that is stored in non-volatile RAM. Thus, once created for a particular device (113 or 118), the file 212 for a specific device exists regardless of whether or not a VM is currently instantiated for the specific device. The file 212 may be created the first time that a device 113, 118 has an iTV signal processed. The file 212 may be written to by a broadcaster to store various information to be used during a later broadcast session. Thus, a file 212 is read from and written to by a VM 202.

The DSM-CC control 224 is for transporting the data. DSM-CC (Digital Storage Media Command and Control) is a control method defined in ISO/IEC 13818-6, which provides access to a file or stream in digital interactive service.

The system registry 230 stores information such as a postal code or other identifier of the location of the device (113 or 118). This information may be stored in the system registry 230 the first time the user runs the interactive TV program (first run). For example, the user is asked to enter a postal code or other information. This information is read from the system registry 230 each time that the VM 202 is instantiated.

Each of the BML VMs 202 is able to exchange data with a server (not depicted in FIG. 2) over network 120*a* to allow the user to have an interactive experience. For example, a user can vote for a contestant on a televised talent show or the user can submit answers to quiz questions. The BML browser 202 and server may communicate via the HTTP protocol.

Figure 3:
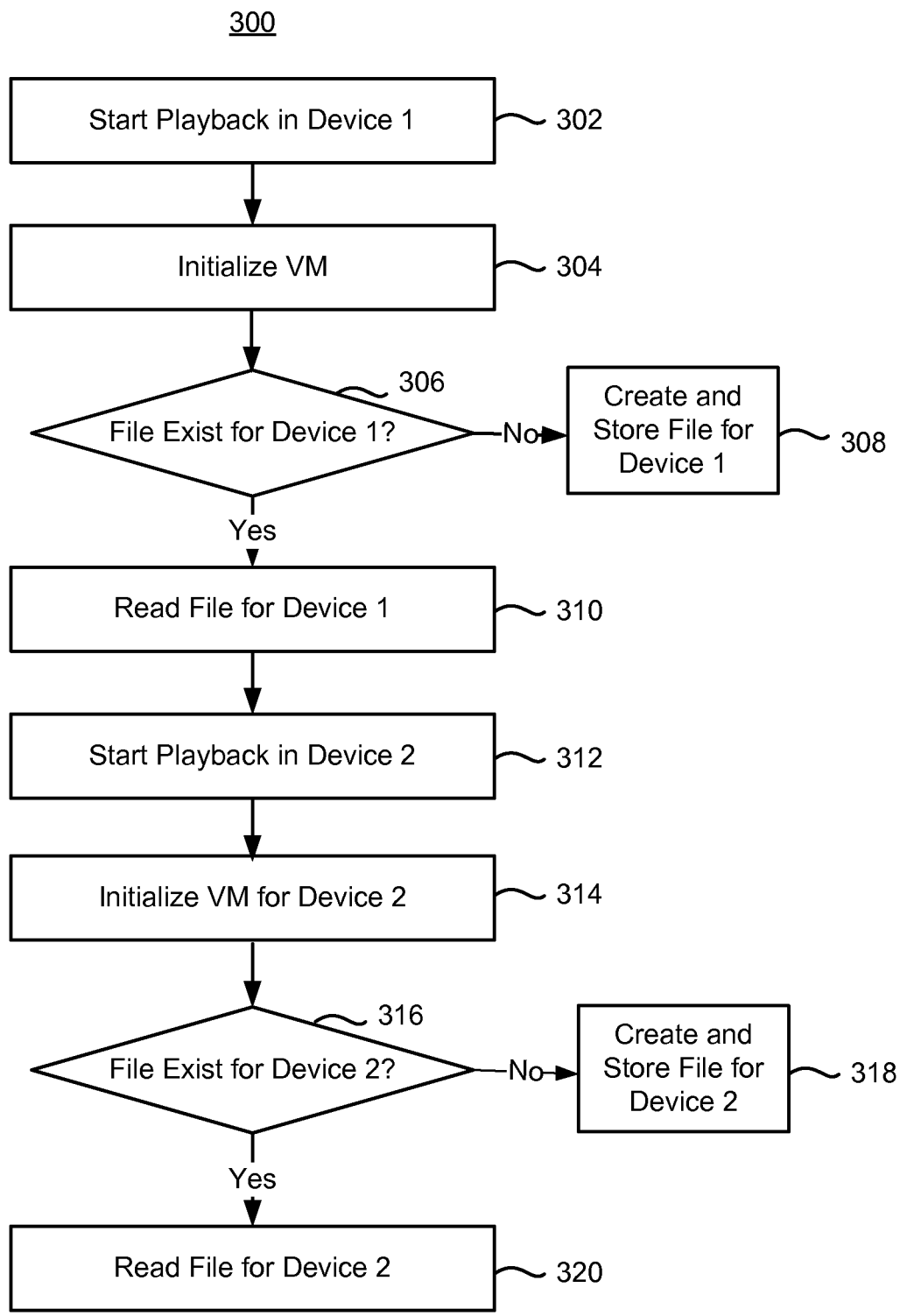
FIG. 3 depicts one embodiment of a process of concurrent iTV for network connected devices.

FIG. 3 depicts one embodiment of a process 300 of concurrent iTV for network connected devices. Process 300 may be implemented by executing computer readable instructions on a processor. In one embodiment, the host device 118 implements process 300. In step 302, playback starts on a first device on a network 120*b* to which the host device 118 is connected. The first device may be either the host device 118 or any extended device 113 on the network 120*b*. Playback refers to playing any signal having iTV. The signal can be live or recorded. Thus, step 302 may occur in response to a user starting up a software application that is for watching television and tuning to a station that has an iTV signal or making a request to play such a pre-recorded signal.

As previously discussed, the extended devices 113 have a network connection to the host device 118. Thus, it is not required that the extended devices 113 themselves have "direct access" to the television signal. In one embodiment, the extended device 113 establishes a communication channel with the iTV platform 240 on the host device 118 in order to establish access to the iTV service. Thus, it is not required that the extended device 113 has a tuner. Note that the host device 118 may have more than one tuner, but this is not a requirement.

In step 304, a VM 202 is initialized (or instantiated) on the host device 118. In one aspect, the iTV platform 240 causes the VM 202 to be initialized. For example, the iTV platform 240 instantiates a VM 202 in response to determining that the television signal for the channel to which the tuner is currently tuned has an interactive component. However, it is not required that the iTV platform 240 make this determination, as the VM 202 might be instantiated without this determination. The VM 202 that gets initialized will depend on the type of iTV signal being processed. For example, a BML VM 202 is initialized for an iTV signal having BML documents therein. Note that initializing a BML VM causes a BML browser 222 to be initialized. In one embodiment, it is assumed that the iTV signal will comply with a particular specification. For example, if the devices 113, 118 are used in Japan it may be assumed that the iTV signal will be compliant with ARIB STD B24 "Data Coding and Transmission Specification for Digital Broadcasting," and thus the VM 202 is compliant with that specification. However, process 300 is not limited to that specification.

In step 306, the VM 202 determines whether there is a file 212 for the first device. If this is the first time that the device has been used for iTV on the network 120*b* there might not be a file 212 (although it is possible to create a file 212 without the device ever having requested to play an iTV signal). If there is not a file 212, then one is created in step 308. Initial information may be stored in the file 212 at this time. However, note that many (or all) of the fields in file 212 may be empty initially. In step 310, the file 212 for the first device is read.

In step 312, playback in a second device is started. Note that this may or may not occur while playback is ongoing in the first device. In step 314, a VM 202 for the second device is initialized (or instantiated) on the host device 118. The VM 202 that gets initialized will depend on the type of iTV signal being processed for the second device. For example, a BML VM 202 is initialized for an iTV signal having BML documents therein. Note that as with the playback in the first device, this may be a live or recorded signal.

In step 316, the VM 202 determines whether there is a file 212 for the second device. If this is the first time that the second device has been used for iTV on the network 120 there might not be file 212. If there is not a file 212, then one is created in step 318. In step 320, the file 212 for the second device is read.

Figure 4:
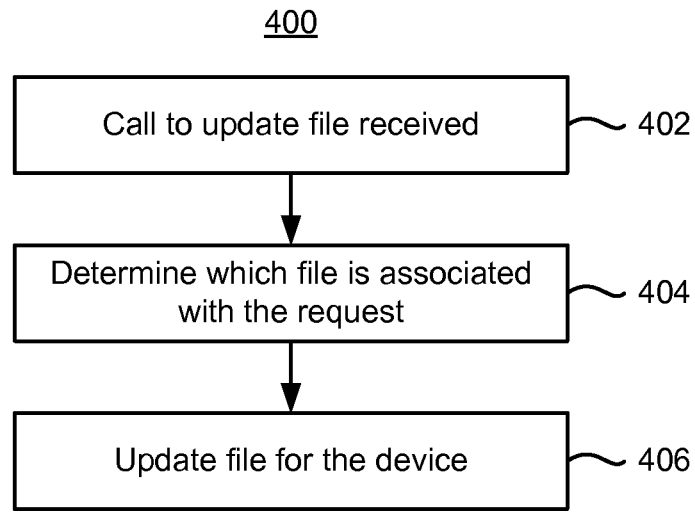
FIG. 4 depicts one embodiment of a process for updating a saved information file.

FIG. 4 depicts one embodiment of a process 400 for updating a file 212. Process 400 may occur at any time that an iTV signal is being played at any device on the network 120*b*. Process 400 may be implemented by executing computer readable instructions on a processor. In one embodiment, the host device 118 implements process 400. In step 402, a call to update a file 212 is received by a VM 202. For example, a broadcaster sends a command in the iTV data stream, which is extracted by the VM 202. The broadcaster might send this command in order to store some information for the next time the use has a session with that broadcaster. For example, the broadcaster might store game parameters for a further session (or even later in that same session). As another example, a user could cause the call to be initiated. For example, the user may want to "bookmark" a particular service. This bookmark is stored in the file 212 by the VM 202 during process 400.

In step 404, the VM 202 determines which file 212 should be updated. In one embodiment, each file 212 is associated with one device (either host 118 or extended device 113).

However, the association is not required to be based on the device. For example, separate files 212 could be created for different users of devices on the network 120b. For example, each family member might have their own file 212. In this way, the iTV experience can be tailored to each individual. In embodiment, a file 212 is created for some combination of device and user. For example, a user can have one file 212 for the PC in the home office and another file 212 for the video game console in the living room.

In step 406, the file 212 is updated. In one embodiment, the update to the file 212 is accomplished by executing a command that is in compliance with a version of the ARIB STD B24 "Data Coding and Transmission Specification for Digital Broadcasting". For example, the VM 202 could execute the command "writePersistentArray," which is described in the ARIB STD B24 specification. However, process 400 is not limited to that specification.

The following table depicts an exemplary data structure for a file 212. In this example, the data structure is for a BML VM 202. However, the data structure is not limited to being associated with a BML VM. As previously stated, the BML browser 222 stores user or broadcaster data, settings and configurations in the file 212. Different example data stored in the file 212 may be used for regional information (e.g., geographic information), storage of game parameters and/or information for shopping services.

| Field Name | Purpose | Size |
| --- | --- | --- |
| Common field | The region is shared among all the broadcasters | 2 KB |
| Affiliation field | The area consists of 4 KB sub-areas. Each sub-area is shared among broadcasters from the same affiliation. The minimum amount of affiliations is 8. | N * 4 KB, N ≥ 8 |
| Broadcaster private field | The area consists of 4 KB sub-areas. Each sub-area is a private region for a particular broadcaster. The area can be accessed only from DSMCC state. The minimum number of broadcasters is 12. | N * 4 KB, N ≥ 12 |
| Broadcaster private area for Internet field | The area consists of 2 KB sub-areas. Each sub-area is a private region for a particular broadcaster. It can be accessed from both Linked and DSMCC states. The minimum number of broadcasters is 12. | N * 2 KB, N ≥ 12 |
| Bookmark field | Temporary string storage area for bookmarking the service. | N * 320 bytes. N ≥ 50 |
| Root certificate field | Region to store X.509 certificate transmitted by DSMCC. | 8 * 3 KB |
| Delayed call message field | Region to keep messages that should be sent to the broadcaster through Modem. Optional. | N * 1.5 KB, N ≥ 3 |
| Receiver Information field | A special area to keep information for set top box: Prefecture code (1 byte), Region code (2 bytes), ZipCode (7 bytes) | 10 bytes |

Figure 5:
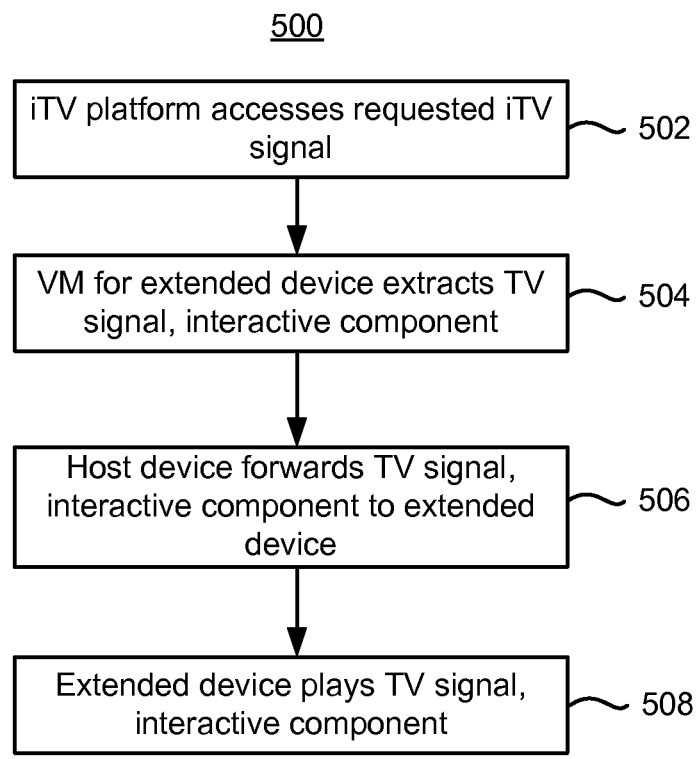
FIG. 5 depicts one embodiment of a process of the host device processing an iTV signal on behalf of an extended device.

FIG. 5 depicts one embodiment of a process 500 of the host device 118 processing an iTV signal on behalf of an extended device 113. Process 500 may begin in response to either step 302 or step 312 of process 300, which is starting playback in a device. The actual execution of the steps in process 500 may begin after the file 212 is read in either step 310 or step 320 of process 300. Process 500 may be implemented by executing computer readable instructions on a processor. In one embodiment, the host device 118 implements steps 502-506 of process 500 and the extended device 113 implements step 508.

In step 502, the iTV platform 240 accesses a selected iTV signal. For example, the iTV platform 240 causes a tuner in the host device 118 to tune to a channel that is specified by the extended device 113. Alternatively, the extended device 113 might request a recorded signal. The iTV platform 240 receives a request from the extended device 113 over the network 120b. Note that this request may be very similar to a request that the iTV platform 240 would receive if a user of the host device 118 were tuning to a particular channel.

In step 504, the VM 202 for the extended device 113 extracts the audio-video portion and the interactive portion from the iTV signal. In one implementation, the interactive portion includes BML documents, which may be similar to web pages.

In step 506, the host device 118 forwards the audio-video signal and the interactive portion (e.g., BML bitmap overlay) to the extended device 113. For example, the VM 202 passes this information to the iTV platform 240, which transfers this information to the extended device 113 across network 120b.

In step 508, the extended device 113 plays the TV signal and the interactive portion. For example, the BML document is displayed in a manner similar to presenting a web page, with a portion of the page reserved for the TV video. Thus, the extended device 113 plays the video (e.g., quiz show) and presents the BML document (e.g., interactive quiz questions) at the same time.

Note that a VM 202 processing the iTV signal for play at the host device 118 may be simpler version of process 500 in that there is no need for communication over the network 120b.

Figure 6:
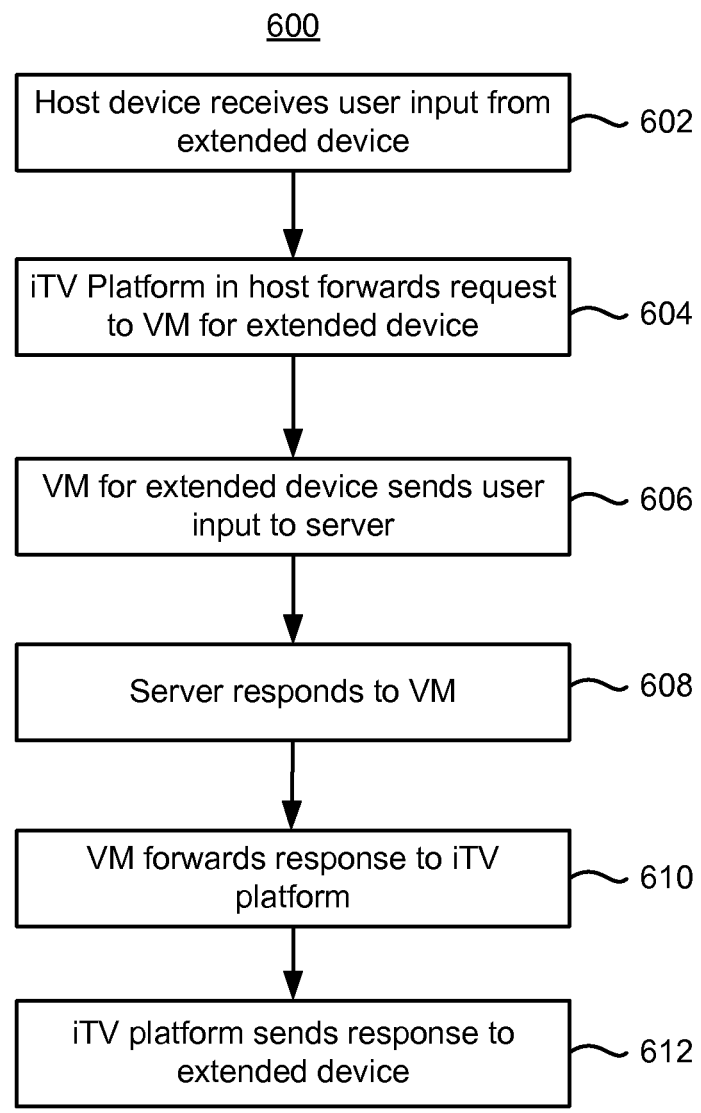
FIG. 6 depicts one embodiment of a process of the host device processing interactive TV commands on behalf of an extended device.

FIG. 6 depicts one embodiment of a process 600 of the host device 118 processing interactive TV events (or interactive actions) on behalf of an extended device 113. The event can be triggered by user input at the extended device. For example, if a user is playing a quiz, the user may wish to send quiz answers to a server (which is on network 120a). As another example, the user might wish to vote for a contestant on a talent show. Process 600 may be implemented by executing computer readable instructions on a processor. In one embodiment, the host device 118 implements process 600. Process 600 takes place while a user is watching iTV on the extended device 113. For example, process 600 might start some time after process 500 has already been completed.

In step 602, the host device 118 receives notification of the event from the extended device via the network 120b. Step 602 occurs after a user has entered user input at the extended device 113. For example, if the extended device 113 is displaying a multiple choice quiz question, then the user might use a remote control to enter a quiz answer. In response to this input, the extended device 113 sends the user entered information to the iTV platform 240 on the host device 118.

In step 604, the iTV platform 240 forwards the user input to the VM 202 that is associated with the extended device 113. In step 606, the VM 202 sends the user input to a server that is on network 120a. In optional step 608, the server sends a response back to the VM 202. In optional step 610, the VM 202 forwards the response to the iTV platform 240, which in turns sends the response to the extended device 113 in step 612.

In some embodiments, the VM 202 is a BML VM that has a BML browser 222 for processing BML documents that are transported in the iTV signal.

In one embodiment, the BML browser 222 is able to handle content in the eXtensible Hyper Text Markup Language (XHTML). This enables the BML browser 222 to handle text information, Cascading Style Sheets (CSS) that define font sizes, character ornamentation, line spacing and other layer characteristics, etc. The BML browser 222 is capable of displaying a wide range of objects such as JPEG, GIF (Graphic Interchange Format), and animation GIF.

Figure 7:
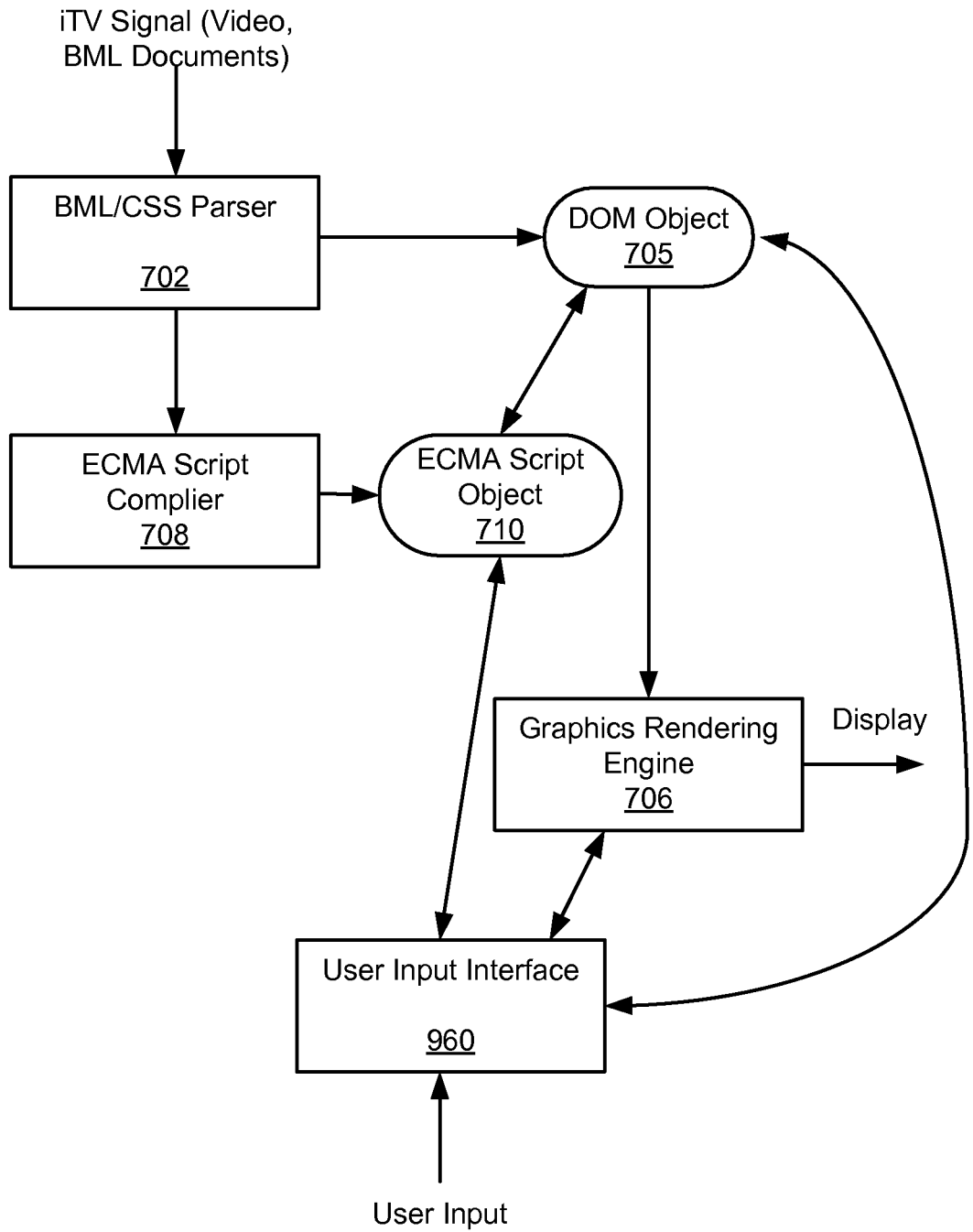
FIG. 7 depicts processing a BML document by various components in one embodiment of a BML browser.

FIG. 7 depicts processing a BML document by various components in one embodiment of a BML browser 222. In general, processing of the BML document by the BML browser 222 may include parsing, DOM tree generation, CSS (cascading style sheet) processing, rendering, ECMA script processing, and event handling.

Referring to FIG. 7, the iTV signal, which includes video data and BML documents are input to a BML/CSS parser 702. The BML/CSS parser 702 analyses the BML document in the iTV signal to generate a DOM tree or DOM object 705. More specifically, the BML/CSS parser 702 analyzes style information described in the BML document to obtain CSS characteristics, which constitute a part of the DOM object 705. The DOM object 705 including the CSS characteristics is transferred to a graphics rendering engine 706 for generating data for a display image screen.

The rendering engine 706 determines rendering values to display the BML document on the display screen. For example, the rendering engine 706 may generate a rendering tree (not depicted in FIG. 7) from the DOM object 705, which is created in earlier processing of the BML document. The rendering engine 706 then traverses the rendering tree to display the BML document. If values (e.g., CSS values) change, the rendering engine 706 generates new rendering values and re-traverses the rendering tree to update the display.

The BML/CSS parser 702 transfers script information from the BML document to an ECMA script compiler 708. The ECMA script compiler 708 generates an executable ECMA script object 710. The ECMA script object 710 is a group of functions.

The user input interface 960 receives user input for event processing. For example, a user uses a remote control (which interfaces with the user input interface 960) to vote for a contestant on a talent show. The DOM object 705 and the ECMA script object 710 are used as a guideline for processing the event.

While several examples have been presented herein in which BML is used it will be understood that the present invention is not limited to BML. Thus, the VM 202 may be compliant with a specification other than ARIB STD B24 "Data Coding and Transmission Specification for Digital Broadcasting."

The host device 118 has logic embedded therein for implementing iTV. In one embodiment, to implement iTV, the host device 118 executes computer readable instructions that are stored on computer readable media. The host device 118 has a processor on which the instructions are executed. Computer readable media can be any available media that can be accessed by the host device 118. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the host device 118.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

Figure 8:
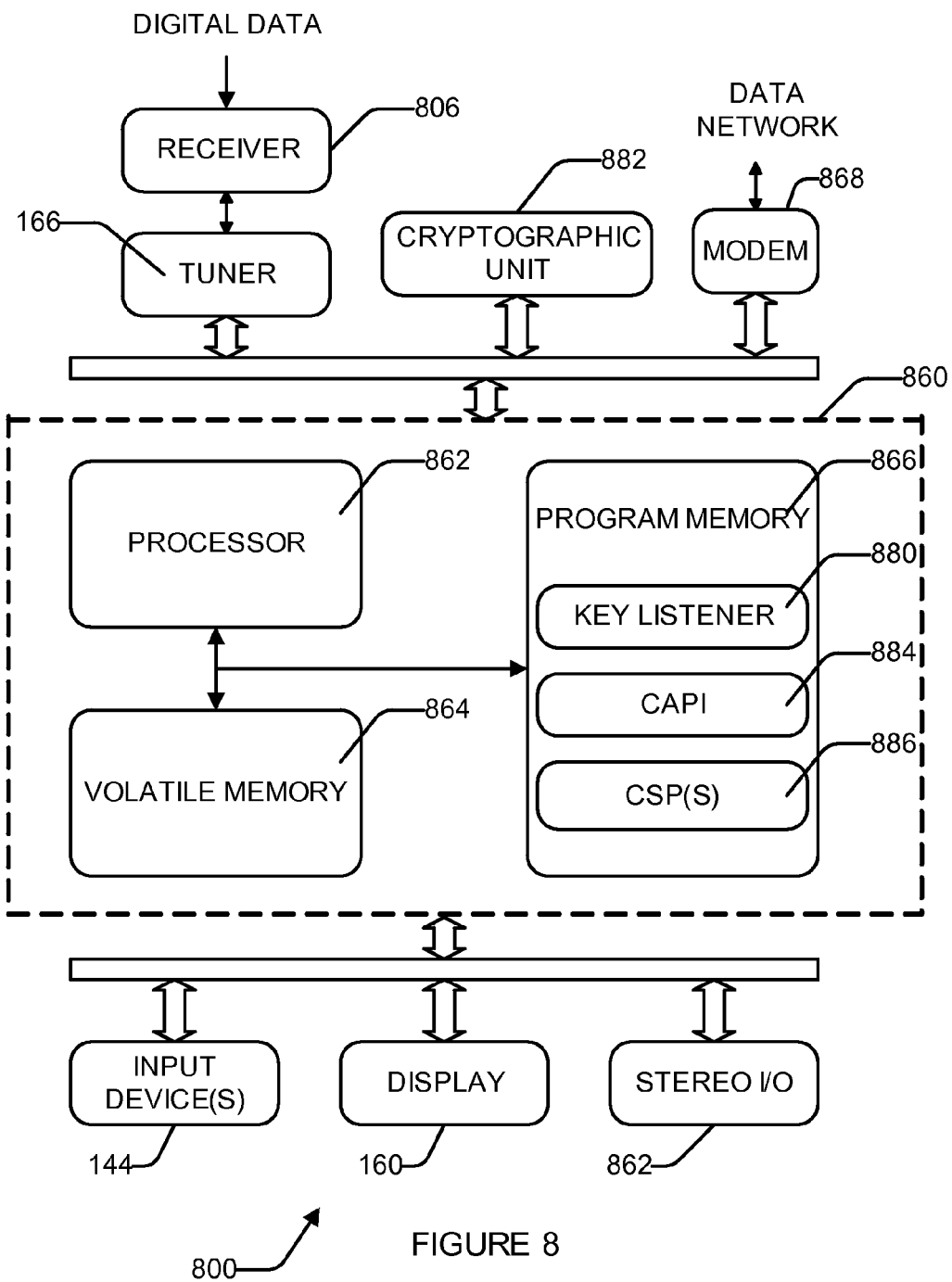
FIG. 8 shows an example configuration of a broadcast-enabled electronic media device that serves as a platform for embodiments of the present invention.

At least some of the embodiments disclosed herein may be implemented on host device 118 and/or extended device 113. FIG. 8 shows an example configuration of a broadcast-enabled electronic media device 800 that may serve to implement at least a portion of the host device 118 and/or extended device 113. Device 800 includes a central processing unit 860 having a processor 862, volatile memory 864 (e.g., RAM), and program memory 866 (e.g., ROM, Flash, disk drive, floppy disk drive, CD-ROM, etc.). The device 800 has one or more input devices 144 (e.g., keyboard, mouse, etc.), a video display 160 (e.g., VGA, SVGA), and a stereo I/O 872 for interfacing with a multi-channel audio system.

The device 800 includes a digital broadcast receiver 806 (e.g., satellite dish receiver, RF receiver, microwave receiver, multicast listener, etc.) and a tuner 166 which tunes to appropriate frequencies or addresses of the broadcast network. The tuner 166 is configured to receive digital broadcast data in a particularized format, such as MPEG-encoded digital video and audio data, as well as digital data in many different forms, including software programs and programming information in the form of data files. The device 800 also has a modem 878, which provides IP network access to the data network to provide a back channel or direct link to a server 104(4), 111. In other implementations of a back channel, the modem 868 might be replaced by a network card, or an RF receiver, or other type of port/receiver that provides access to the back channel.

The device 800 runs an operating system that supports multiple applications. The operating system may be a multitasking operating system that allows simultaneous execution of multiple applications. The operating system may employ a graphical user interface windowing environment that presents the applications or documents in specially delineated areas of the display screen called "windows."

The device is illustrated with a key listener 880 to receive the authorization and session keys transmitted from the server 104(4), 111, if any. The keys received by listener 880 are used by cryptographic security services implemented in a protection mechanism in the host device 118 and/or extended device 113 to enable decryption of the session keys and data. Cryptographic services are implemented through a combination of hardware and software. A secure, tamper-resistant hardware unit 882 is provided external to the CPU 860 and two software layers 884, 886 executing on the processor 862 are used to facilitate access to the resources on the cryptographic hardware 882.

The software layers include a cryptographic application program interface (CAPI) 884 that provides functionality to any application seeking cryptographic services (e.g., encryption, decryption, signing, or verification). One or more cryptographic service providers (CSPs) 886 implement the functionality presented by the CAPI to the application. The CAPI layer 884 selects the appropriate CSP for performing the requested cryptographic function. The CSPs 886 perform various cryptographic functions such as encryption key management, encryption/decryption services, hashing routines, digital signing, and authentication tasks in conjunction with the cryptographic unit 882. A different CSP might be configured to handle specific functions, such as encryption, decryption, signing, etc., although a single CSP can be implemented to handle them all. The CSPs 886 can be implemented as dynamic linked libraries (DLLs) that are loaded on demand by the CAPI, and which can then be called by an application through the CAPI 884. Note that the key listener 880, CAPI 884, and CSP 886 are optional.

Figure 9:
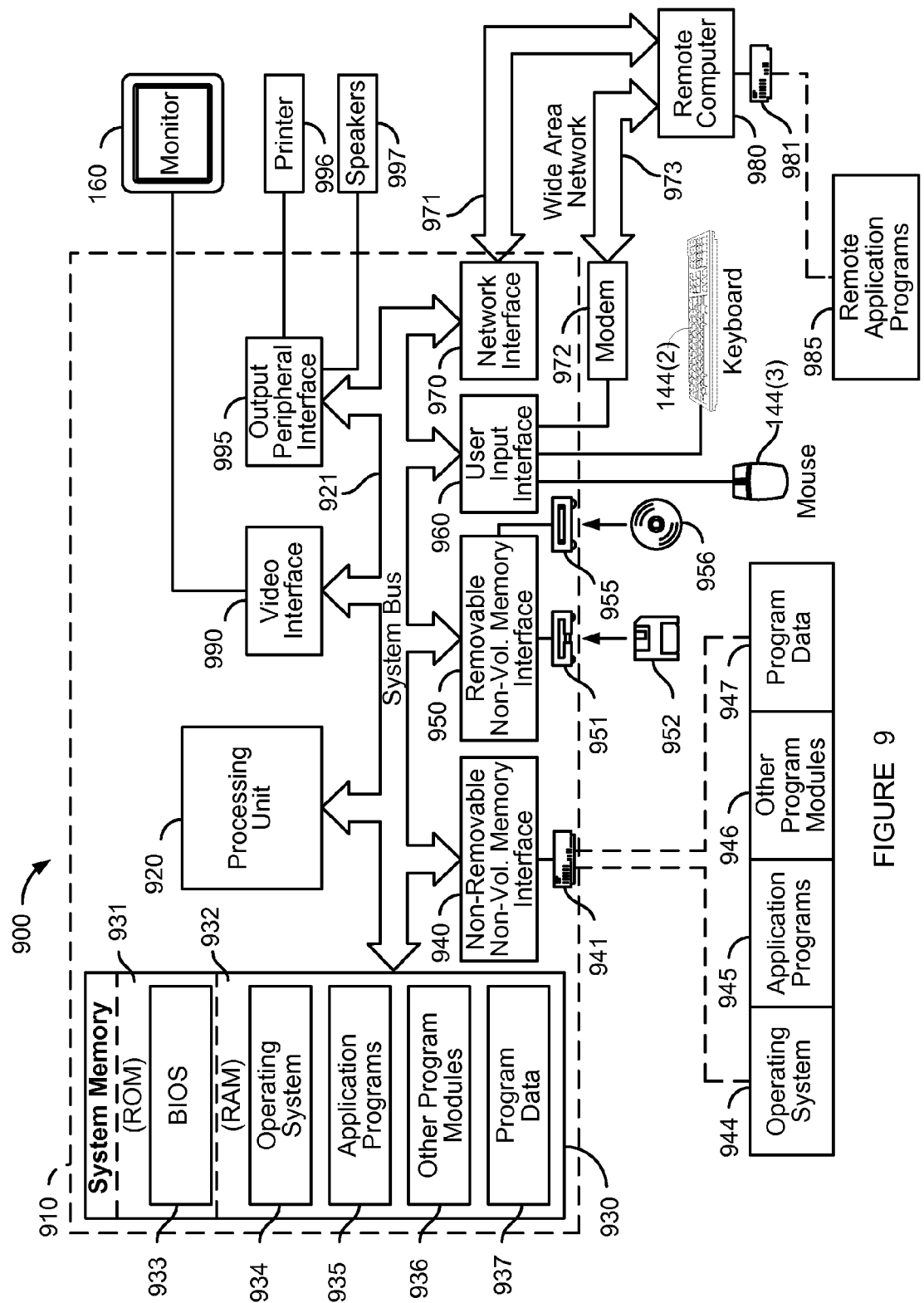
FIG. 9 depicts an example computer system that serves as a platform for embodiments of the present invention.

With reference to FIG. 9, an exemplary system for implementing the inventive system includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

In one embodiment, to implement process 300, 400, 500, and/or 600 computer readable instructions that are stored on computer readable media are executed on a processor. Computer 910 may include a variety of computer readable media. Computer readable media can be any available media that can be accessed by computer 910 and includes both volatile and nonvolatile media, removable and non-removable media. Combinations of any of the above are also included within the scope of computer readable media.

The system memory 930 includes computer storage media in the form of volatile and/or nonvolatile memory such as ROM 931 and RAM 932. A basic input/output system (BIOS) 933, containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disc drive 941 that reads from or writes to non-removable, nonvolatile magnetic media and a magnetic disc drive 951 that reads from or writes to a removable, nonvolatile magnetic disc 952. Computer 910 may further include an optical media reading device 955 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 941 is typically connected to the system bus 921 through a non-removable memory interface such as interface 940. Magnetic disc drive 951 and optical media reading device 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disc drive 941 is illustrated as storing operating system 944, application programs 945, other program modules 946, and program data 947. These components can either be the same as or different from operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 144(2) and a pointing device 144(3), commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus 921, but may be connected by other interface and bus structures, such as a parallel port, game port or a universal serial bus (USB). A monitor 160 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be the extended device 113. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communication over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communication link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A machine implemented method comprising:
receiving a request to play a first interactive television signal at a first electronic device that executes an interactive television (iTV) platform;
instantiating a first virtual machine for processing the first interactive television signal, the first virtual machine is instantiated by the iTV platform at the first electronic device;
accessing a first file that includes information associated with playing interactive TV on the first electronic device, the first file is stored in non-volatile storage on the first electronic device;
establishing a communication channel over a network between a second electronic device and the iTV platform on the first electronic device;
receiving a request to play a second interactive television signal at the second electronic device, the second electronic device is communicatively coupled to the first electronic device;
instantiating a second virtual machine for processing the second interactive television signal, the second virtual machine is instantiated by the iTV platform at the first electronic device;
processing the second interactive television signal with the second virtual machine;
providing the processed second interactive television signal to the second electronic device;
accessing a second file that includes information associated with playing interactive TV on the second electronic device, the second file is stored in non-volatile storage on the first electronic device;
receiving a request at the second virtual machine to store information associated with playing the second interactive television signal for a later interactive television session, the request to store information associated with playing the second interactive television signal includes a command in the second interactive television signal;
determining, by the second virtual machine, which of the first file and the second file to update in response to the request; and
storing, by the second virtual machine, the information associated with playing the second interactive television signal in the second file in response to determining that the second file should be updated.

2. A machine implemented method as recited in claim 1, further comprising:
receiving a request to read information from the second file, the storing the information in the second file occurs during a first interactive television session and the request to read information from the second file occurs during a second interactive television session; and
reading information from the second file during the second interactive television session.

3. A machine implemented method as recited in claim 1, further comprising:
receiving a request from the second electronic device to perform an interactive action, the request received at the first electronic device;
providing the request to the second virtual machine.

4. A machine implemented method as recited in claim 3, further comprising:
forwarding information to a server associated with processing the request, the forwarding performed by the second virtual machine.

5. A machine implemented method as recited in claim 1, wherein the first virtual machine includes a BML browser and the second virtual machine includes a BML browser.

6. The machine implemented method as recited in claim 1, further comprising:
receiving a request at the second virtual machine from the second electronic device to update the second file; and
updating, by the second virtual machine, the second file in response to the request from the second electronic device.

7. An apparatus comprising:
a computer readable storage medium;
a processor coupled to the computer readable storage medium; and
a communication interface coupled to the processor;
the computer readable storage medium stores a plurality of files, each of the files includes information associated with playing interactive TV on a particular electronic device, the computer readable storage medium has instructions stored thereon which, when executed on the processor, cause the processor to implement:
an interactive television platform; and
a virtual machine for processing interactive television signals;
the interactive television platform communicates with a plurality of electronic devices over a network connected to the communication interface, the interactive television platform initializes a separate instance of the virtual machine for each of the plurality of electronic devices, the virtual machine for a given electronic device is dedicated to that given electronic device;
the interactive television platform receives a request to play a first interactive television signal at a first electronic device of the plurality of electronic devices, the interactive television platform initializes a first instance of the virtual machine for processing the first interactive television signal; and
the first instance of the virtual machine accesses a first file of the plurality of files, the first file includes information associated with playing interactive TV on the first electronic device, the first instance of the virtual machine extracts interactive television content from the first interactive television signal, the interactive television content is provided to the first electronic device using the communication interface,
the first instance of the virtual machine extracts a first command from the first interactive television signal that requests that information associated with playing interactive TV be stored for a later interactive television session, the first instance of the virtual machine determines which of the plurality of files should be updated in response to the first command, the first virtual machine stores the information associated with playing interactive television in the first file in response to determining that the first file should be updated.

8. An apparatus as recited in claim 7, wherein the first virtual machine:
extracts a second command from a second interactive television signal that requests that previously stored information that is associated with playing interactive television on the first electronic device be accessed; and
reads the previously stored information from the first file.

9. An apparatus as recited in claim 7, wherein:
the interactive television platform receives a request from the first electronic device to perform an interactive action; and the interactive television platform provides the request to the first instance of the virtual machine.

10. An apparatus as recited in claim 7, wherein the first instance of the virtual machine forwards information to a server associated with processing the request.

11. An apparatus as recited in claim 7, wherein the first instance of the virtual machine includes a BML browser.

12. The apparatus of claim 7, wherein the computer readable storage medium stores a second plurality of files, each of the second plurality of files includes information associated with playing interactive TV for a particular user, the first instance of the virtual machine extracts a second command from the first interactive television signal that requests that information associated with playing interactive TV be stored, the first instance of the virtual machine determines which of the second plurality of files should be updated in response to the second command.

13. The apparatus of claim 7, wherein the plurality of files include a file that is for a combination of a user and one of the plurality of electronic devices.

14. The apparatus as recited in claim 7, further comprising a tuner, the interactive television platform causes the tuner to tune to a channel that is specified by the given electronic device.

15. A machine implemented method comprising:
receiving a request to play a first interactive television signal at a host electronic device that executes an interactive television (iTV) platform;
instantiating a first Broadcast Markup Language (BML) virtual machine for processing the first interactive television signal, the first BML virtual machine is instantiated at the host electronic device by the iTV platform and includes a first BML browser;
accessing a first file that includes information associated with playing interactive TV on the host electronic device, the first file is stored in non-volatile storage on the host electronic device;
extracting a first video signal and a first BML document from the first interactive television signal using the first BML virtual machine;
playing the first video signal and presenting the first BML document on the host electronic device;
establishing a communication channel over a network between an extended electronic device and the iTV platform on the host electronic device;
receiving a request at the iTV platform over the communication channel to play a second interactive television signal at the extended electronic device, including the iTV platform causing a tuner on the host device to tune to a channel that is specified by the extended device;
instantiating a second BML virtual machine for processing the second interactive television signal, the second BML virtual machine is instantiated at the host device by the iTV platform and includes a second BML browser;
accessing a second file that includes information associated with playing interactive TV on the extended electronic device, the second file is stored in non-volatile storage on the host electronic device;
extracting a second video signal and a second BML document from the second interactive television signal using the second BML virtual machine and providing the second video signal and the second BML document to the iTV platform;
providing the second video signal and the second BML document to the extended electronic device over the communication channel by the iTV platform, the providing the second video signal and the second BML document is performed while playing the first video signal and presenting the first BML document on the host electronic device,
receiving a request at the second BML virtual machine to store information associated with playing the second interactive television signal for a later interactive television session, the request to store information associated with playing the second interactive television signal includes a command in the second interactive television signal;
determining, by the second BML virtual machine, which of the first file and the second file to update in response to the request; and
storing, by the second BML virtual machine, the information associated with playing the second interactive television signal in the second file in response to determining that the second file should be updated.

16. A machine implemented method as recited in claim 15, further comprising:
receiving a request to read the information for the extended electronic device, the storing the information in the second file occurs during a first interactive television session and the request to read occurs during a second interactive television session; and
reading the information in the second file.

17. A machine implemented method as recited in claim 16, further comprising:
receiving a request from the extended electronic device to perform an interactive action, the request received at the host electronic device;
providing the request to the second virtual machine.

18. A machine implemented method as recited in claim 17, further comprising:
forwarding information to a server associated with processing the request, the forwarding performed by the second virtual machine.

19. The machine implemented method as recited in claim 15, further comprising:
receiving a request at the second BML virtual machine from the extended electronic device to update the second file; and
updating, by the second BML virtual machine, the second file in response to the request.

* * * * *